March 26, 1957 V. J. LUNDELL 2,786,317
HAY CHOPPER AND DISCHARGE SPOUT THEREFOR
Filed Aug. 20, 1953. 2 Sheets-Sheet 1
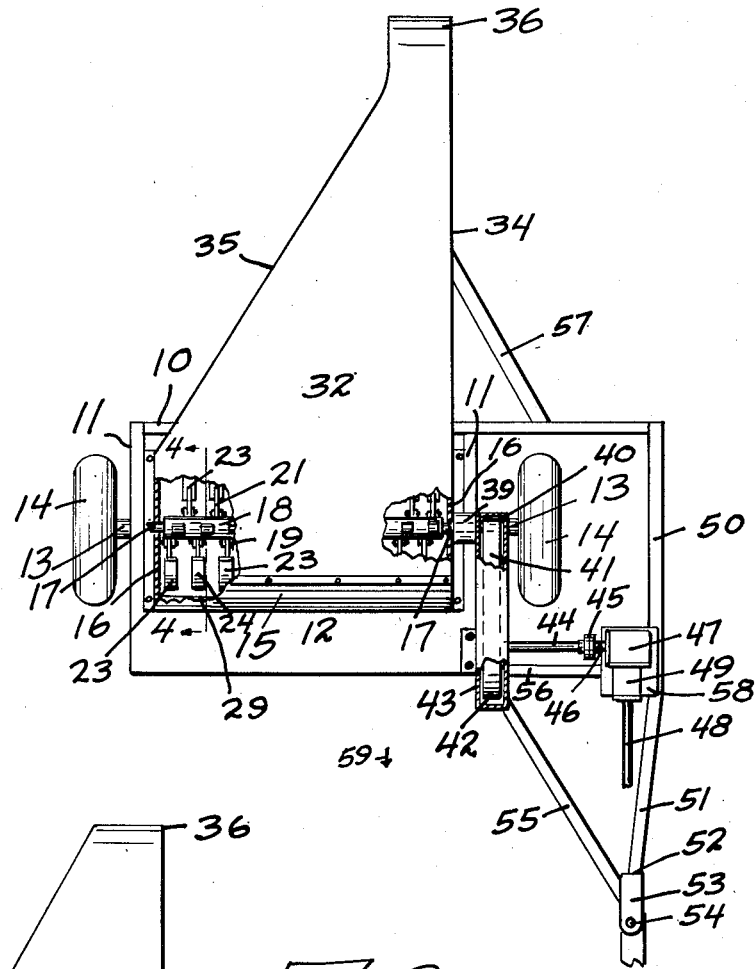
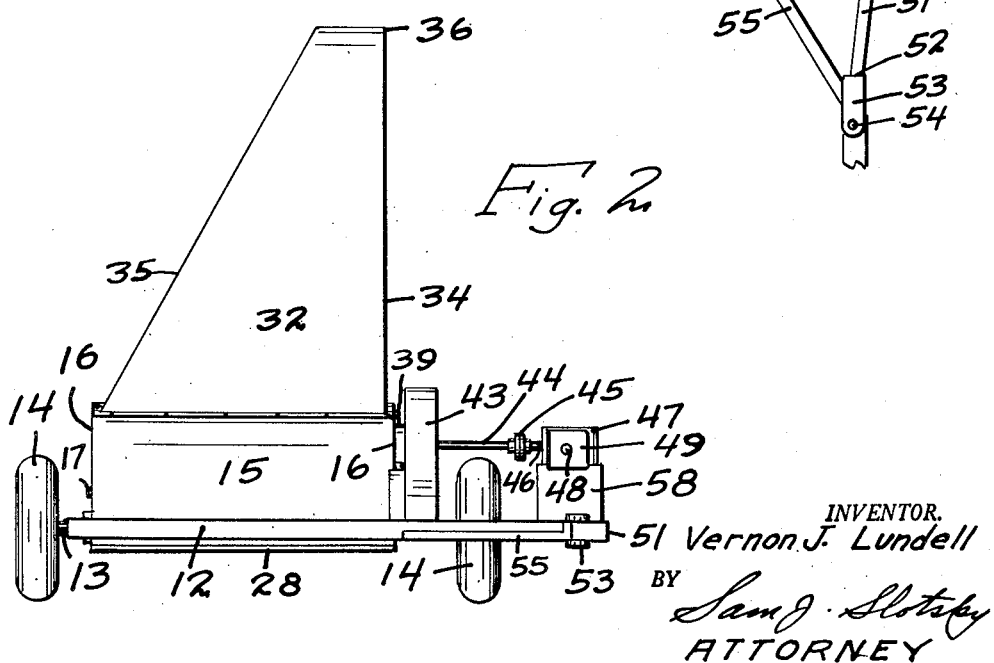
INVENTOR.
Vernon J. Lundell
BY
Sam J. Slotsky
ATTORNEY March 26, 1957  V. J. LUNDELL  2,786,317
HAY CHOPPER AND DISCHARGE SPOUT THEREFOR
Filed Aug. 20, 1953  2 Sheets-Sheet 2
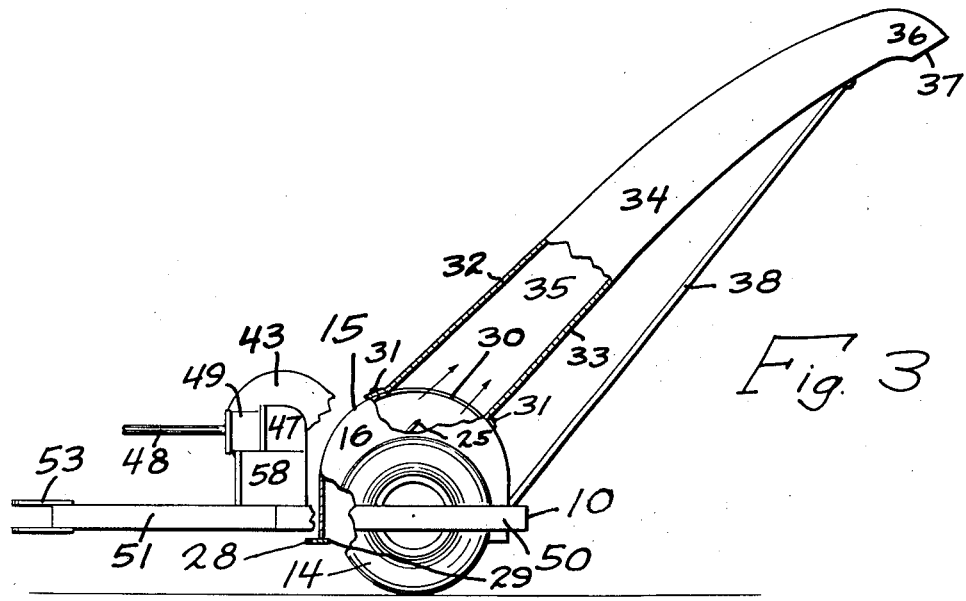
Fig. 3
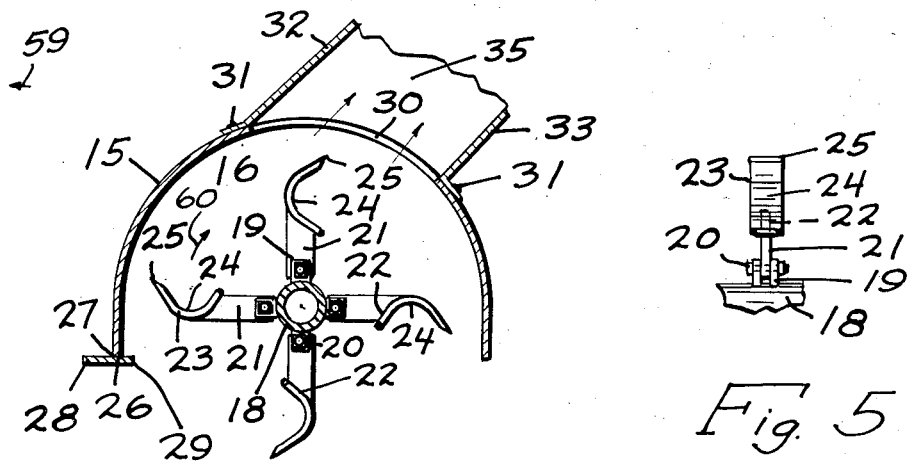
Fig. 4
Fig. 5
INVENTOR.
Vernon J. Lundell
BY
Sam J. Slotsky
ATTORNEY United States Patent Office 2,786,317
Patented Mar. 26, 1957

2,786,317

HAY CHOPPER AND DISCHARGE SPOUT THEREFOR

Vernon J. Lundell, Cherokee, Iowa

Application August 20, 1953, Serial No. 375,445

4 Claims. (Cl. 55—118)

My invention relates to a hay chopper.

An object of my invention is to provide a device which will gather hay from the field, or which will cut standing crops in the field and whereby the same device will also further chop the hay or other crop after it is gathered from the field, and to provide an arrangement in which the crop thus chopped is efficiently thrown directly into a discharge member, said discharge member having a rear terminal point through which the material can pass into a wagon or the like.

A further object of my invention is to provide such a device in which the chopping portions of the device include certain members which will efficiently gather or cut the crop material and thence impel the same quickly and directly into the discharge chute without the necessity of using other conveying apparatus and the like.

A further object of my invention is to provide such an arrangement which can be drawn by a tractor, and can be powered therefrom.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a plan view of the device, portions thereof being taken in section, with parts removed, Figure 2 is an end view of the device, Figure 3 is a side view of the device with portions thereof being taken in cross section, with parts removed, Figure 4 is an enlarged view taken in section along the lines 4—4 of Figure 1, and Figure 5 is a detail.

My invention contemplates the provision of a hay chopper, which includes an arrangement wherein the same cutting device used to gather the crop, also chops the crop, and thence conveys the same directly to a discharge chute, such conveyance being performed in a manner wherein the chopped crop is directed thereto in a highly efficient manner.

I have used the character 10 to designate a transverse framework member to which are attached the framework members 11 which in turn are attached to a further transverse framework member 12.

Attached to the members 11 are the shafts 13 upon which are journaled the wheels 14.

Suitably secured to the framework members is a downwardly concave arcuate housing 15 having the end walls 16 and journaled in the end walls 16 are the transverse shaft members 17 which are rigidly secured to the ends of the cylindrical pipe member 18.

Attached at spaced intervals along the pipe member 18 are the pairs of spaced ears 19 and pivotally secured to the ears 19 by means of the bolts 20 are the strap members 21 which are welded at 22 to the transversely positioned members 23, the members 23 having the arcuate portions 24, and terminating in the beveled ends 25.

Welded at 26 to one of the lower edges 27 of the member 15 is the transverse cutting bar 28 having the inner edge 29.

The casing 15 includes an opening at 30 and attached about the perimeter of this opening at 31 is an angularly positioned discharge member having the upper wall 32, the lower wall 33, side wall 34 and the angularly inclined further side wall 35, all of these walls merging into the reduced portion at 36 which includes a discharge opening at 37. The character 38 indicates a brace member.

It will be noted from Figure 1 that the various members 23 are in staggered relation, so that each member 23 as it rotates will practically fill the space between the further members 23, there being four rows of such members as shown in Figure 4.

One of the shafts 17 passes through a housing 39, the shaft 17 being attached to a small pulley 40 over which passes a belt 41, the belt 41 passing over a larger pulley 42, these pulleys and belt being positioned within a casing 43.

Attached to the pulley 42 is a shaft 44 which is attached to the coupling 45 which in turn is attached to a further short shaft 46 which passes within the casing 47, the casing 47 including suitable gearing for driving the shaft 48 which shaft passes through the further casing member 49, the shaft 48 being suitably connected to the takeoff power shaft of the tractor which draws the device, this arrangement thereby driving the shafts 44 and 17.

The character 50 designates a further framework portion which extends into the portion 51 which is secured at 52 to the hitching device 53 which includes the opening 54 for providing attachment to the tractor draw bar, the character 55 indicating a further bracing member, the characters 56 and 57 indicating further framework and bracing members. The casing 47, 49 rests upon a platform 58.

The device is pulled along the field by the tractor in the direction of the arrow 59 as shown in Figures 1 and 4, the members 23 rotating in the direction of the arrow 60.

During such rotation the crop is either gathered or cut by the edges 25 of the members 23 at the lower points of rotation, the material being thence further chopped up as the members 23 pass the edge 29 of the bar 28, the chopped material thence being thrown directly through the opening 30 and into the chute comprising the walls 32, 33, 34 and 35, the wall 35 serving to deflect and concentrate the material toward the portion 36, the material then passing through the opening 37 into the wagon and so forth, which is passing behind the unit, it being understood that the wagon or other receptacle can be towed in any desired manner.

In further explanation of the above, the standing crop will be cut at the ground level or slightly above due to the fact that the hammer members including the portions 24 are so heavy and travel at such a high rate of speed that the considerable impact at the moment of contact instantly severs the crop, with the edge 29 merely further chopping the crop into a more finely divided form.

I have found that the arcuate portions 24 in combination with the further elements of the members 23 provide an arrangement which has a very high efficiency in gathering, chopping and impelling the material into the chute, the rotation of the entire unit providing an advantageous method for chopping and transferring the material for ensilage or other purposes in a highly efficient manner.

The pivoting at 20 of the bars 21 permit the swinging units to be released momentarily when the units strike against unresisting members in the field, thereby preventing breakage of the swinging bars.

It will now be noted that the device of my invention provides the advantages mentioned with other advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A crop gathering machine comprising a semi-cylindrical casing having its concavity facing downwardly and disposed transversely of the line of travel, a framework to which said casing is secured, a rotating chopping and gathering structure journalled in said casing and substantially co-axial therewith for chopping and gathering standing crops, and including a plurality of radially positioned hammers, an upper discharge spout communicating directly through an upper portion of said casing, the lower end of said spout being substantially co-extensive with said casing, the direction of rotation of the ends of said radially positioned hammers being such that when chopping said crops approximately at ground level or thereabove, said ends will travel in the same direction as that in which said machine is traveling, whereby said chopped crop will be impelled directly from said hammers upwardly into said spout and outwardly through the end of said spout.

2. A crop gathering machine comprising a semi-cylindrical casing having its concavity facing downwardly and disposed transversely of the line of travel, a framework to which said casing is secured, a rotating chopping and gathering structure journalled in said casing and substantially co-axial therewith, for chopping and gathering standing crops, and including a plurality of radially positioned hammers, an upper discharge spout communicating directly through an upper portion of said casing, the lower end of said spout being substantially co-extensive with said casing, the direction of rotation of the ends of said radially positioned hammers being such that when chopping said crops approximately at ground level or thereabove, said ends will travel in the same direction as that in which said machine is traveling, whereby said chopped crop will be impelled directly from said hammers upwardly into said spout and outwardly through the end of said spout, the discharge end of said spout being substantially smaller in area than the lower end thereof.

3. A crop gathering machine comprising a semi-cylindrical casing having its concavity facing downwardly and disposed transversely of the line of travel, a framework to which said casing is secured, a rotating chopping and gathering structure journalled in said casing and substantially co-axial therewith for chopping and gathering standing crops, and including a plurality of radially positioned hammers, an upper discharge spout communicating directly through an upper portion of said casing, the lower end of said spout being substantially co-extensive with said casing, the direction of rotation of the ends of said radially positioned hammers being such that when chopping said crops approximately at ground level or thereabove, said ends will travel in the same direction as that in which said machine is traveling, whereby said chopped crop will be impelled directly from said hammers upwardly into said spout and outwardly through the end of said spout, said casing including a transversely positioned cutting bar attached along one of its lower edges and toward which said hammers rotate, the inner edge of said cutting bar being spaced from said hammers.

4. A crop gathering machine comprising a semi-cylindrical casing having its concavity facing downwardly and disposed transversely of the line of travel, a framework to which said casing is secured, a rotating chopping and gathering structure journalled in said casing and substantially co-axial therewith, for chopping and gathering standing crops, and including a plurality of radially positioned hammers, an upper discharge spout communicating directly through an upper portion of said casing, the lower end of said spout being substantially co-extensive with said casing, the direction of rotation of the ends of said radially positioned hammers being such that when chopping said crops approximately at ground level or thereabove, said ends will travel in the same direction as that in which said machine is traveling, whereby said chopped crop will be impelled directly from said hammers upwardly into said spout and outwardly through the end of said spout, the discharge end of said spout being substantially smaller in area than the lower end thereof, said casing including a transversely positioned cutting bar attached along one of its lower edges and toward which said hammers rotate, the inner edge of said cutting bar being spaced from said hammers.

References Cited in the file of this patent

UNITED STATES PATENTS

| | | |
|---|---|---|
| 1,893,871 | Romera | Jan. 10, 1933 |
| 2,585,296 | Bennett et al. | Feb. 12, 1952 |
| 2,659,188 | Haban | Nov. 17, 1953 |